(12) United States Patent
Sridharan (10) Patent No.: US 8,266,110 B1
(45) Date of Patent: Sep. 11, 2012

(54) INTEGRATED ARCHIVAL AND BACKUP

(75) Inventor: Srineet Sridharan, Pune (IN)

(73) Assignee: Symantec Corporation, Mountain View, CA (US)

( * ) Notice: Subject to any disclaimer, the term of this patent is extended or adjusted under 35 U.S.C. 154(b) by 139 days.

(21) Appl. No.: 12/910,160

(22) Filed: Oct. 22, 2010

(51) Int. Cl.
*G06F 7/00* (2006.01)
*G06F 17/00* (2006.01)

(52) U.S. Cl. ........................................ 707/661; 707/640

(58) Field of Classification Search .................. 707/640, 707/661
See application file for complete search history.

(56) References Cited

U.S. PATENT DOCUMENTS

| | | | |
|---|---|---|---|
| 7,107,416 B2 * | 9/2006 | Stuart et al. | 711/159 |
| 7,155,466 B2 * | 12/2006 | Rodriguez et al. | 707/694 |
| 7,293,027 B2 * | 11/2007 | Margolus | 1/1 |
| 7,440,982 B2 * | 10/2008 | Lu et al. | 1/1 |
| 7,475,107 B2 * | 1/2009 | Maconi et al. | 709/202 |
| 7,493,307 B2 * | 2/2009 | Gillespie et al. | 1/1 |
| 7,693,891 B2 * | 4/2010 | Stokes et al. | 707/695 |
| 8,041,677 B2 * | 10/2011 | Sumner et al. | 707/640 |
| 2002/0073106 A1 * | 6/2002 | Parker et al. | 707/200 |
| 2008/0162595 A1 * | 7/2008 | Kushwah et al. | 707/203 |
| 2009/0249005 A1 * | 10/2009 | Bender et al. | 711/162 |
| 2011/0106769 A1 * | 5/2011 | Baptist et al. | 707/652 |

* cited by examiner

*Primary Examiner* — Charles Lu
(74) *Attorney, Agent, or Firm* — Campbell Stephenson LLP (57) ABSTRACT

Various systems and methods can integrate archival and backup. One method involves accessing a first backup image and generating a first set of indexing information for the first backup image. The first set of indexing information identifies one or more data items included within the first backup image. The method then compares the first set of indexing information to a second set of indexing information associated with a second backup image, which is generated subsequent to a time at which the first backup image is generated. Based upon this comparison, the method can identify a first data item of the one or more data items as having been modified or deleted after the time at which the first backup image was generated. The method can then copy the first data item from the first backup image to an archival data repository, prior to deletion of the first backup image.

18 Claims, 4 Drawing Sheets

INTEGRATED ARCHIVAL AND BACKUP

FIELD OF THE INVENTION

This invention relates to the creation of backups and archival copies.

DESCRIPTION OF THE RELATED ART

Organizations are increasingly turning to archival systems in order to preserve data for compliance and discovery purposes. These archival systems identify all of the data items (e.g., emails, electronic documents, and the like) that need to be preserved and store copies of those items. The archival systems can even store a copy of each version of each data item. Unfortunately, introducing an independent archival system into an organization's existing infrastructure can drastically increase the amount of computing power, production system down time, and/or data storage needed to support the organization.

SUMMARY OF THE INVENTION

Various systems and methods for integrating archival and backup are disclosed. One such method involves accessing a first backup image and generating a first set of indexing information for the first backup image. The first set of indexing information identifies one or more data items included within the first backup image. The method then compares the first set of indexing information to a second set of indexing information associated with a second backup image, which is generated subsequent to a time at which the first backup image is generated. Based upon this comparison, the method can identify a first data item of the one or more data items as having been modified or deleted after the time at which the first backup image was generated. The method can then copy the first data item from the first backup image to an archival data repository, prior to deletion of the first backup image.

The backup images processed by such a method can be block-level, file-level, or data-item-level backup images. In some embodiments, the act of copying is performed in response to detecting that the first backup image will be deleted.

Generation of the first set of indexing information can involve accessing metadata associated with the first backup image. The metadata can be generated during a backup window in which the first backup image is generated. The method can add the first set of indexing information to an index, which identifies archived data items.

In some embodiments, the method receives a request to access an archived copy of a data item identified in the index. In response to receiving the request, the method accesses the data item in the first backup image.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
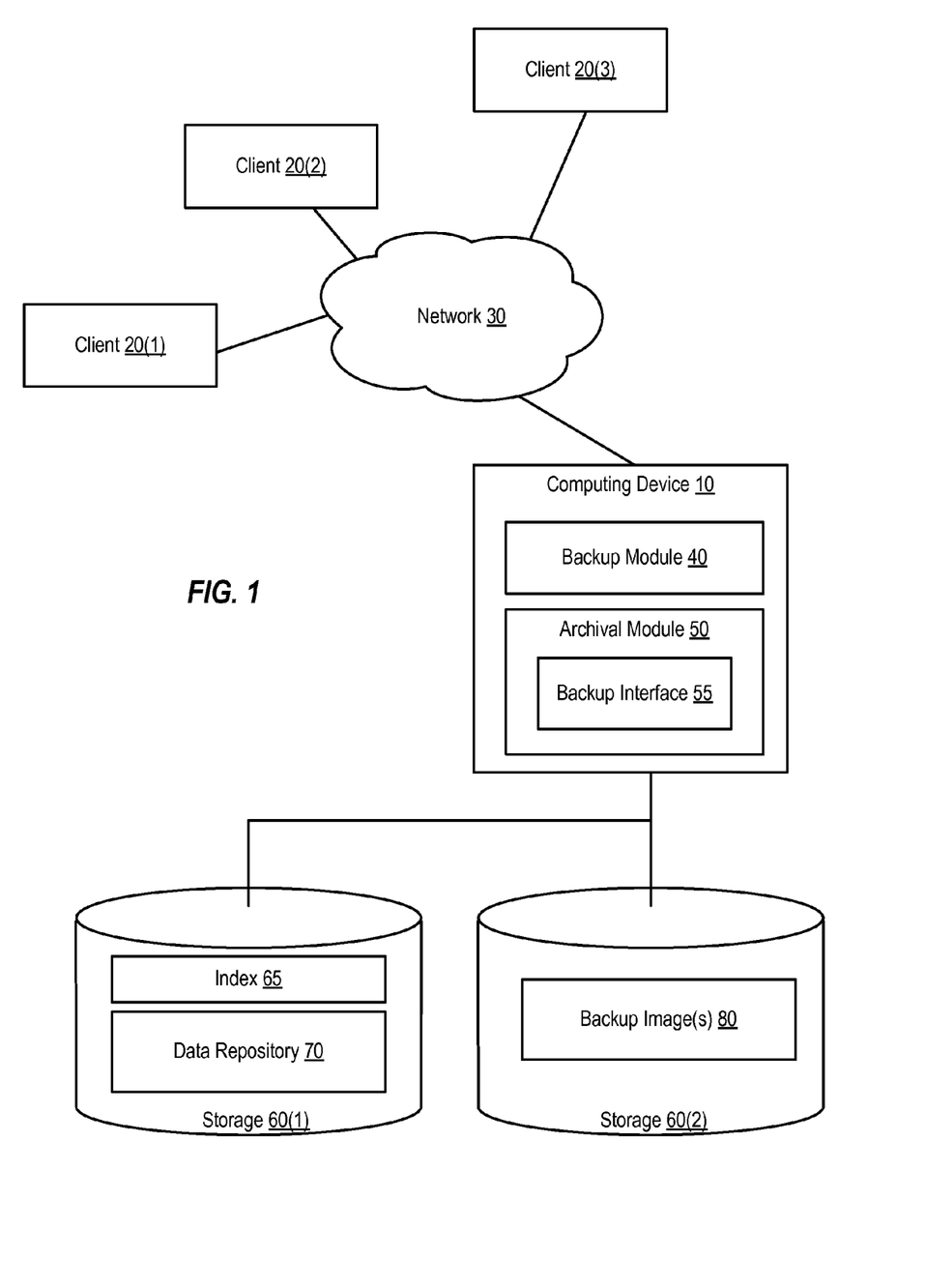
FIG. 1 is a block diagram of a system that integrates archival and backup functionality, according to one embodiment of the present invention.

FIG. 1 is a block diagram of a computing system that integrates data archival with data backup. In particular, instead of using an independent archival system to maintain a data archive, this system uses an archival system that includes an interface to access backups generated by the backup system. This can reduce or even avoid the archival system's needing to interfere with the operation of system endpoints (e.g., client computing devices and production data repositories) in order to discover content for potential archival and needing to make separate copies of each archived data item (in addition to copies that may already be present within the system). For example, instead of discovering content by processing endpoint data directly, the archival system can instead use the backup interface to discover content included in a backup image. This can reduce the archival system's impact on the endpoints. Additionally, instead of making copies of each data item automatically upon discovery, the archival system can instead create references to copies of the data items already stored in backup images. The archival system can use the backup interface to track the status of the backup images, such that if a backup image is going to be deleted, the archival system can first process the backup image to discover any data items that should be archived and then make copies of any archived data items within that backup image.

The computer system of FIG. 1 includes a computing device 10 that is coupled to several client computing devices 20(1), 20(2), and 20(3) by network 30. Computing device 10 and client computing devices 20(1), 20(2), and 20(3) can each include any of a variety of different types of computing devices, including servers, personal computing devices, laptop computers, net books, personal digital assistants, cellular phones, or the like. Client computing devices 20(1), 20(2), and 20(3) are examples of endpoints within the computing system. Endpoints are system components that store data that is captured in backups. Endpoints can include computing devices like clients 20(1), 20(2), and 20(3) as well as storage devices (e.g., such as those storing production data managed by a file server or database server) and/or network devices.

Computing device 10 implements a backup module 40 and an archival module 50. It is noted that alternative embodiments may implement these modules on separate computing devices.

Backup module 40 is configured to backup data stored on endpoints. Each time backup module 40 performs a backup operation, backup module 40 creates a backup image that is a point-in-time copy (e.g., a copy of data just as that data existed at a specific point in time) of the data being backed up. Backups can be full backups, which include all of the data targeted for backup, or incremental backups, which include only the data that has changed since a prior backup. Backups can be performed in response to specific user requests. Additionally, backups can be performed in a routine manner (e.g., periodically or in response to predefined stimuli). In some embodiments, backups can even be performed continuously.

Backup module 40 stores each backup image generated during a backup operation as one of backup images 80 on storage device 60(2). Backup images can be generated at the block level or at the file (or other data item) level. Block-level backups can be created by simply copying an entire endpoint storage device, block by block, without regard to the logical organization of the data stored within that storage device. In contrast, file-level backups can be created by copying each file (or other data item, such as emails or components of a database) to backup.

Archival module 50 is configured to archive data items generated on the system endpoints. Archival module 50 creates an index 65, which contains indexing information that identifies each archived data item and its location within data repository 70 and/or backup image(s) 80. The index may also include other metadata describing each data item in terms of its properties and/or content. In this example, index 65 and data repository 70 are stored on the same storage device 60(1). In other embodiments, index 65 may be stored on a different storage device than data repository 70.

Storage devices 60(1) and 60(2) can each include one or more of a variety of different storage devices, including hard drives, compact discs, digital versatile discs, solid state drive (SSD) memory such as Flash memory, and the like, or one or more logical storage devices such as volumes implemented on one or more such physical storage devices. Storage devices 60(1) and 60(2) may also include arrays of such storage devices.

As briefly noted above, archival module 50 includes a backup interface 55 that allows archival module to access backup images 80 generated by backup module 40. Accordingly, instead of needing to interact with endpoints directly to generate index 65 and data repository 70, archival module 50 can instead simply process backup images 80.

Backup interface 55 is configured to identify each backup image created by the backup system and to process that backup image. Backup interface 55 can process backup images asynchronously with respect to the backup process, such that the archival system's processing does not lengthen the amount of time that endpoints are disrupted by backup operations relative to the amount of time normally taken to perform backup operations in systems that do not include an archival module. Each backup operation is performed during a span of time referred to as a backup window. During the backup window, endpoints may not be able to access their data normally (e.g., access may be blocked, so as to allow the backup module to generate a point-in-time image of the data). Backup interface 55 can be configured to process backup images subsequent to the closure of the backup window.

Processing of a backup image by backup interface 55 can involve identifying each data item within the backup image that needs to be archived, as well as generating a set of indexing information for that backup image. The set of indexing information becomes part of index 65.

In some embodiments, backup interface 55 generates the set of indexing information for a backup image by accessing the backup image and then identifying each data item within the backup image. Data items can include files, emails, database components, and other logical data structures. The archival module can be configured to archive all data items or a prespecified subset of data items (e.g., based upon the content, type, and/or properties of those data items). For example, the archival module can be configured to index all emails sent by a certain subset of organization employees.

If the backup image is a file-level backup image, backup interface 55 can simply browse the backup image to identify the data items included within the backup image. In some situations (e.g., if the backup image includes a copy of a personal storage table (PST) file that includes multiple emails), backup interface 55 can additionally open a containing data item in order to identify one or more data items contained within.

If the backup image is instead a block-level backup image, backup interface 55 can be preconfigured with information identifying the backup image format and use that information in order to appropriate process the backup image. For example, backup interface 55 can be preconfigured (e.g., by an administrator, when installing the archive module) with information identifying where certain file system information is stored within each backup image, and can then use that information to mount the copy of the file system included in the backup image. The backup interface 55 can then browse the file system in order to identify the data items included within the backup image.

In alternative embodiments, each endpoint may include a client (not shown) that is configured to generate indexing information for that endpoint and to provide that information to the backup interface (e.g., during the backup window). Such a client may operate continuously or in a routine manner (e.g., periodically or in response to predetermined stimuli). In some embodiments, the client generates this indexing information in response to detecting that a backup operation has begun. This indexing information can be included in and/or associated with backup images generated by backup module 40. Accordingly, in such embodiments, backup interface 55 can generate the indexing information for such backup images by simply accessing the appropriate indexing information generated by the client. Backup interface 55 can then additionally process the indexing information and/or associated backup image, if needed.

Once backup interface 55 has generated a set of indexing information for a particular backup image, backup interface 55 can add that indexing information to index 65. Backup interface 55 can then compare the indexing information to indexing information associated with other backup images in order to identify changes between the content of those backup images. For example, backup images can be created at time T1 and time T3 respectively. A data item included in the set of data being backed up can be deleted at time T2, where T1<T2<T3. Accordingly, the backup image created at time T1 will include a copy of that data item, but the backup image created at time T3 will not. By comparing the indexing information associated with the two backup images, backup interface 55 can detect this change.

In order to conserve storage space used within the system shown in FIG. 1, backup interface 55 can be configured to create references to copies of data items in backup images 80 within index 65. Accordingly, in such embodiments, so long as a data item is present within a backup image, there is no need to create an additional copy of that data item within data repository 70. As such, index 65 can include references to both data repository 70 and backup images 80. When a user (e.g., an application or human) requests access to an archived data item, index 65 can identify (via the reference associated with that data item) the location (e.g., within a backup image and/or data repository) of that data item. The archived data item can then be accessed from the location identified by the reference in the index. A data item can be copied from backup images 80 to data repository 70 in response to detecting that the last backup image containing a copy of that data item is about to be deleted, as described in more detail below.

In some systems, backup images can be removed from storage at certain times. For example, at least some backup images can be deleted by an administrator. Similarly, in some systems, at least some backup images expire in a routine manner. For example, some backup may expire upon reaching a certain age (e.g., 12 months old) or in response to certain stimuli (e.g., incremental backup images may expire upon the creation of a new full backup image). Backup interface 55 is configured to detect situations (such as a request from an administrator, the aging of a particular backup image, or the occurrence of certain stimuli) that trigger the deletion of backup images.

In response to detecting such a situation, backup interface 55 interacts with backup module 40 (and/or an administrator, through the use of error messages or the like) to prevent the backup image from being deleted until after backup interface 55 has processed the backup image to generate the associated indexing information and, if needed, to copy data items from the backup image to data repository 70. The need to copy of a particular data item can be determined by comparing indexing information associated with that backup image to indexing information associated with the next most recently created backup image. If this comparison indicates that a data item was deleted (or modified, if each version of the data item is to be archived) subsequent to the creation of the backup image that is going to be deleted and prior to the creation of the next backup image, then backup interface 55 identifies that this backup image contains the last copy of the data item and will copy the data item to data repository 70 before the backup image storing that data item is deleted. By doing this, backup interface 55 ensures that archived data items are preserved while also eliminating the need to store redundant copies of each data item in both the backup and archival storage devices.

It is noted that if there is no prior backup image (e.g., if the backup image being processed is the first backup image generated for the system), then none of the data items in that backup image will already exist in the data repository. Accordingly, all data items in the first backup image (or at least all that are selected for archival) will be copied to the data repository. In contrast, only some data items (or even no data items, if no data items have been deleted and/or modified between the times at which successive backup images were created) may be copied to data repository 70 from subsequently generated backup images.

In some embodiments, comparing the indexing information associated with different backup images can simply involve comparing whether the two backup images store the same data item (e.g., the same file, as determined by comparing information identifying the files stored in each backup image by file name). In other embodiments, each different version of a data item can be archived, and thus the comparison can involve comparing both information identifying data items and information identifying properties, such as modification times, of those data items.

In some embodiments, instead of comparing indexing information to identifying changes in the contents of different backup images, backup interface 55 may include and/or be configured to access a file change log (e.g., such as Windows Change Journal™ for Microsoft Windows™ operating systems) or a custom filter driver that identifies which files were created, deleted, and/or modified since the previous backup. In such an embodiment, backup interface may be able to process the backup images without needing to compare indexing information for the backup images.

While the above description described situations in which data items are not copied from backup images until the deletion of those backup images is imminent, other embodiments may be implemented differently, such that data items are copied to data repository 70 from a backup image prior to detecting the imminent deletion of that backup image. In these embodiments, there may be some redundancy, at least during certain time periods, between data repository 70 and backup images 80.

It is noted that backup images 80 and data repository 70 may be organized in different manners. For example, backup images 80 may be block-level backup images, while data repository 70 may be organized in a granular manner (e.g., at the file or data item level), such that each data item is stored independently of each other data item. Thus, when data items are copied from backup images 80 to data repository 70, the manner in which those data items are stored may be altered.

FIG. 1 shows an example of a situation in which archive module 50 and backup module 40 are implemented separately. In other embodiments, these modules can be integrated within the same software product.

Additionally, FIG. 1 shows an example of a situation in which an archival module includes a backup interface for accessing backup images. It is noted that alternative embodiments can instead implement an archival interface, which is configured to push information about backup images to an archival module, within a backup module.

Figure 2:
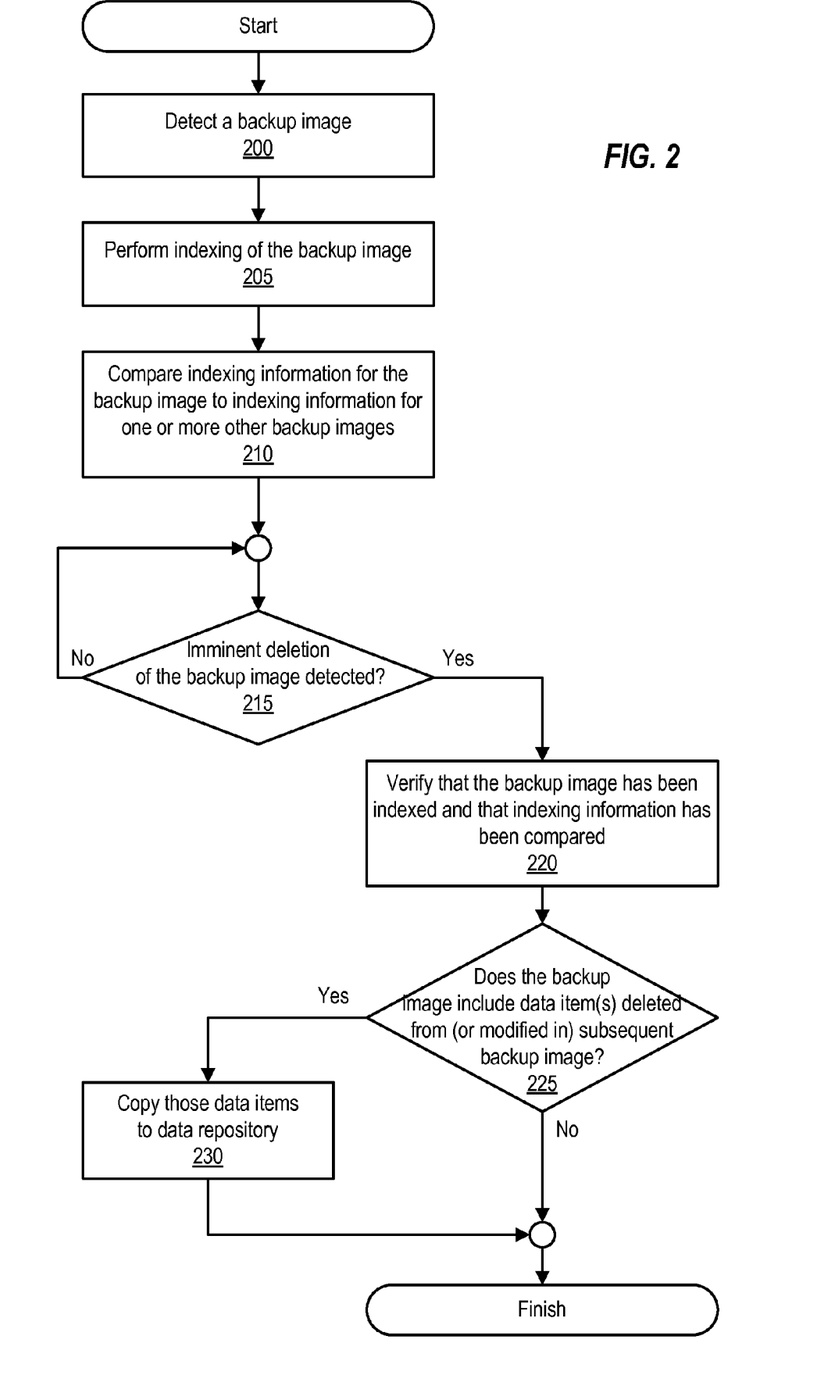
FIG. 2 is a flowchart of a method of integrating archival and backup functionality, according to embodiments of the present invention.

FIG. 2 is a flowchart of a method of integrating archival and backup. This method can be performed by an archival module that includes a backup interface, like archival module 50 of FIG. 1, or by any other appropriate module configured to communicate information about backup images to an archival system.

The method begins at 200, when the archival module detects the creation of a backup image by the backup system. The archival module then accesses the backup image in order to identify and index the data items included within that backup image, as shown at 205. Indexing the backup image can include identifying all of the data items that should be added to an archive.

At 210, the archival module compares the indexing information associated with the backup image to indexing information associated with one or more other backup images, in order to identify whether the contents of the backup images differ. This operation can be used to detect situations in which a particular data item has been modified, deleted, or added between the times at which successively-generated backup images were generated.

The archival module can monitor the stored backup images in order to detect the imminent deletion of the backup image, as shown at 215. This operation can be performed by comparing the current age of the backup image to an age at which the backup image will expire, comparing the current time to a time at which the backup image will expire, detecting stimuli (e.g., the creation of a new full backup image, if the backup image is an incremental backup image) that indicates the imminent deletion of the backup image, detecting requests (e.g., generated by a backup administrator) to delete the backup image, and the like.

If the imminent deletion of the backup image is detected, the archival module can verify that the backup image has been fully indexed and that the indexing information has been compared to that associated with one or more other backups, as needed, as shown at 220. If this verification operation fails, the archival module can generate an error message and/or delay the deletion of the backup image until the indexing and comparison operations have been performed.

If the comparison operation indicates that the backup image includes any data items that have been deleted prior to and/or modified prior to the creation of the next backup image generated after the backup image, the archival module can copy those data items from the backup image to an archival data repository prior to deletion of the backup image, as shown at 225 and 230. Once operations 220 and 225 (and 230, if needed) have been performed, archival module can allow the backup image to be deleted by the backup system.

The operations shown in FIG. 2 can be repeated for each backup image generated by the backup system, such that multiple different backup images can be processed. In some embodiments, different backup images can even be processed during overlapping time periods. Some operations may be omitted in certain embodiments, and other embodiments may include other operations instead of and/or in addition to those depicted in FIG. 2.

Figure 3:
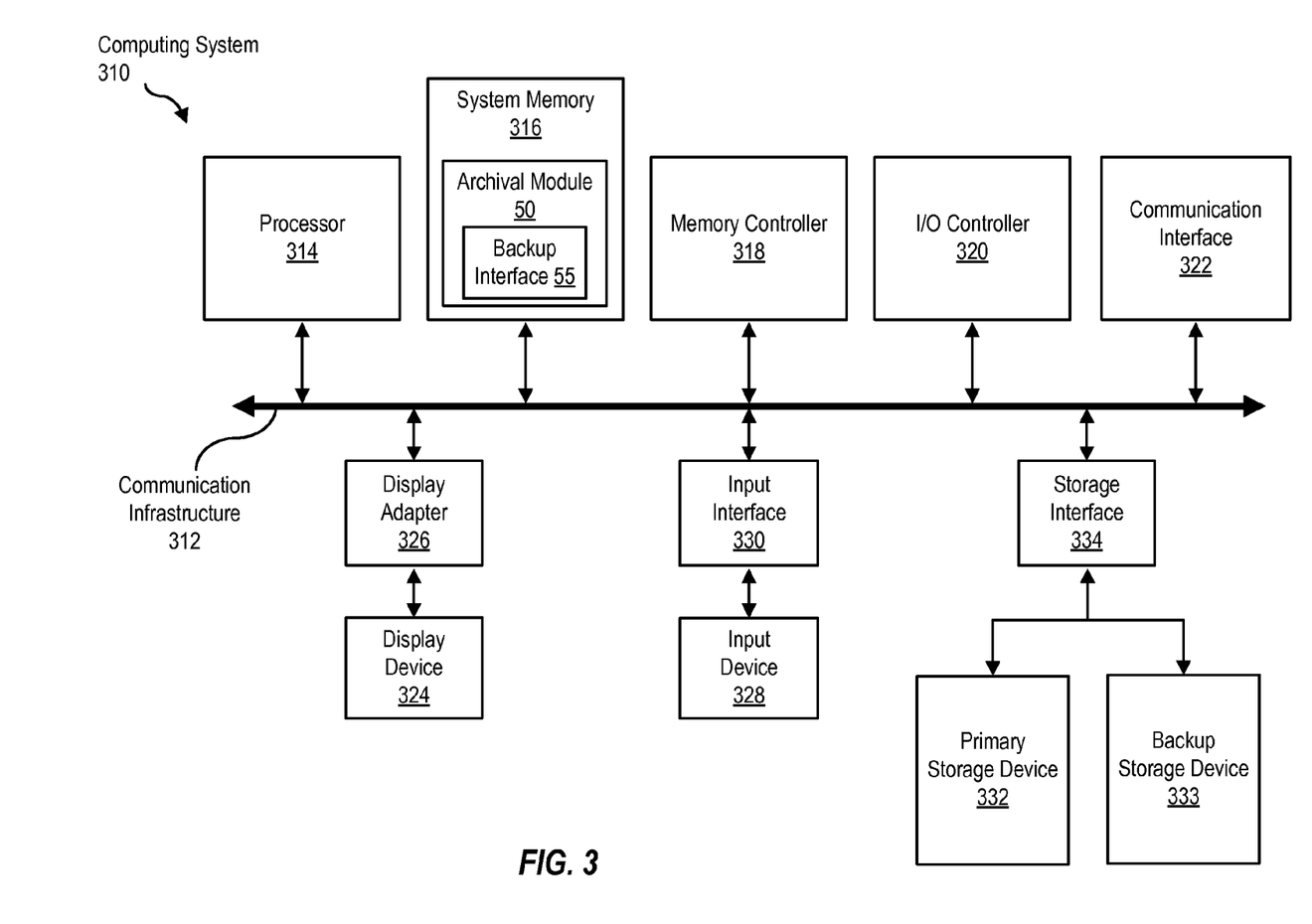
FIG. 3 is a block diagram of a computing device, illustrating how an archival module with a backup interface can both be implemented in software, according to one embodiment of the present invention.

FIG. 3 is a block diagram of a computing system 310 capable of implementing an archival module with a backup interface as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements an archival module with a backup interface, computing system 310 becomes a special purpose computing device that is configured to integrate an archival system with a backup system.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing all or some of the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. In one example, program instructions implementing an archival module 50 with a backup interface 55 may be loaded into system memory 316.

In certain embodiments, computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 3, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 3, computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may each include a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310. A storage device like primary storage device 332 can be used to implement an archival data repository and/or backup storage, as described above.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 4:
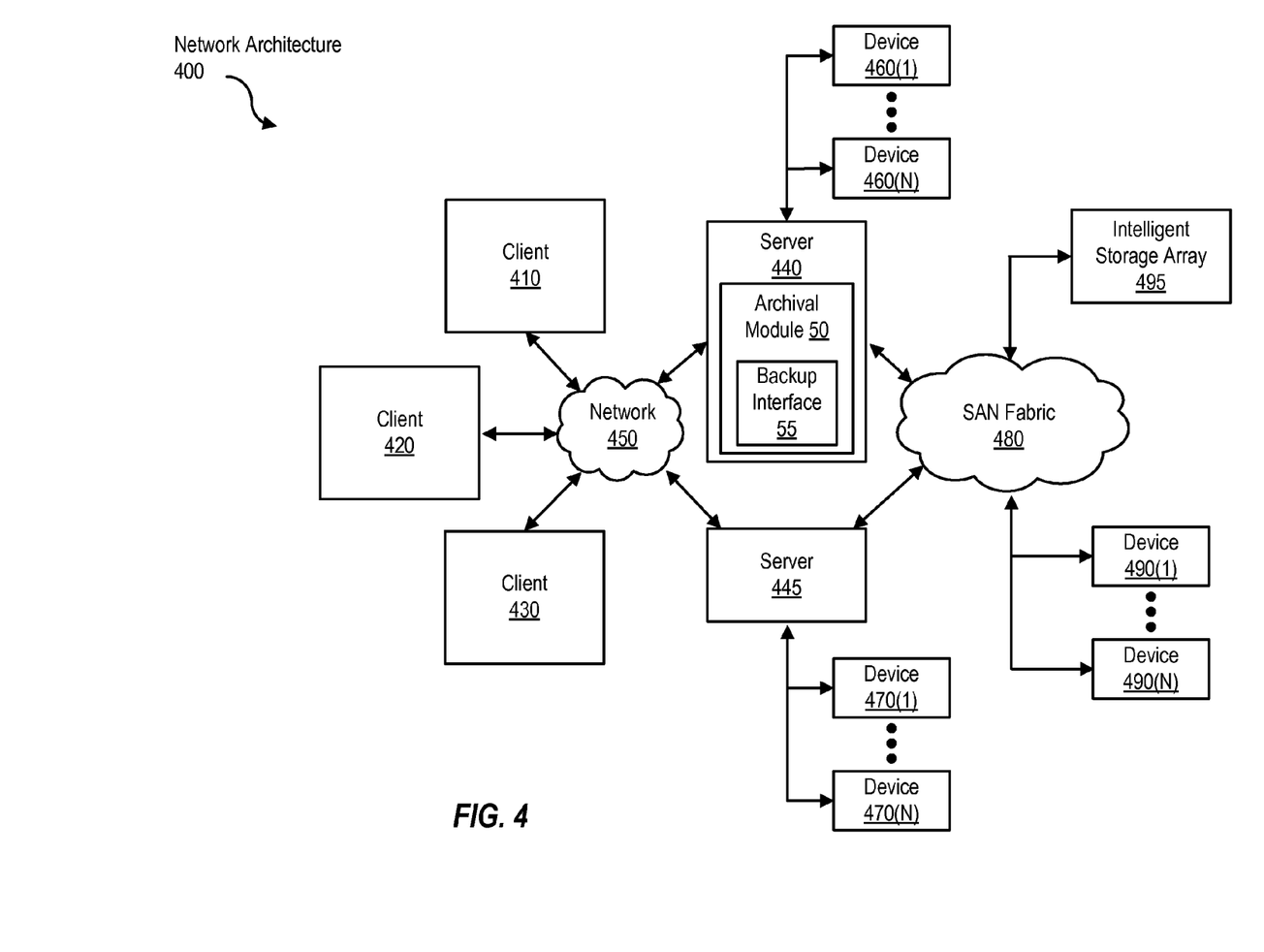
FIG. 4 is a block diagram of a networked system, illustrating how various computing devices can communicate via a network, according to one embodiment of the present invention.

FIG. 4 is a block diagram of a network architecture 400 in which client systems 410, 420, and 430 and servers 440 and 445 may be coupled to a network 450. Client systems 410, 420, and 430 generally represent any type or form of computing device or system.

Similarly, servers 440 and 445 generally represent computing devices or systems, such as application servers or database servers implemented on a computing device such as computing system 310 in FIG. 3, configured to provide various database services and/or run certain software applications. Network 450 generally represents any telecommunication or computer network including, for example, an intranet, a wide area network (WAN), a local area network (LAN), a personal area network (PAN), or the Internet. In one example, client systems 410, 420, and/or 430 and/or servers 440 and/or 445 may include an archival module 50 that includes a backup interface 55 as shown in FIGS. 1 and 3.

As illustrated in FIG. 4, one or more storage devices 460(1)-(N) may be directly attached to server 440. Similarly, one or more storage devices 470(1)-(N) may be directly attached to server 445. Storage devices 460(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS).

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 460(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 3, may be used to provide connectivity between each client systems 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 460(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 460(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of the computing devices in FIGS. 1, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an archival module 50 with a backup interface 55 in FIG. 1 may transform behavior of a computing device in order to cause the computing device to create an archival data repository by indexing backup images and copying data items from those backup images to the data repository on an as-needed basis.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    accessing a first backup image;
    generating a first set of indexing information for the first backup image, wherein the first set of indexing information identifies one or more data items included within the first backup image;
    comparing the first set of indexing information to a second set of indexing information associated with a second backup image, wherein the second backup image is generated subsequent to a time at which the first backup image is generated;
    identifying a first data item of the one or more data items as having been modified or deleted after the time at which the first backup image is generated, in response to the comparing; and
    copying the first data item from the first backup image to an archival data repository, prior to deletion of the first backup image.

2. The method of claim 1, wherein the copying is performed in response to detecting that the first backup image will be deleted.

3. The method of claim 1, wherein the generating the first set of indexing information comprises accessing metadata associated with the first backup image, wherein the metadata was generated during a backup window in which the first backup image was generated.

4. The method of claim 1, wherein the first backup image is a block-level backup image.

5. The method of claim 1, further comprising adding the first set of indexing information to an index, wherein the index identifies archived data items.

6. The method of claim 5, further comprising:
    receiving a request to access an archived copy of a data item identified in the index;
    in response to the receiving, accessing the data item in the first backup image.

7. A computer readable storage medium comprising program instructions executable to:
    access a first backup image;
    generate a first set of indexing information for the first backup image, wherein the first set of indexing information identifies one or more data items included within the first backup image;
    compare the first set of indexing information to a second set of indexing information associated with a second backup image, wherein the second backup image is generated subsequent to a time at which the first backup image is generated;
    identify a first data item of the one or more data items as having been modified or deleted after the time at which the first backup image is generated, in response to comparing the first and second sets of indexing information; and
    copy the first data item from the first backup image to an archival data repository, prior to deletion of the first backup image.

8. The computer readable storage medium of claim 7, wherein the first data item is copied in response to detecting that the first backup image will be deleted.

9. The computer readable storage medium of claim 7, wherein generation of the first set of indexing information comprises accessing metadata associated with the first backup image, wherein the metadata was generated during a backup window in which the first backup image was generated.

10. The computer readable storage medium of claim 7, wherein the first backup image is a block-level backup image.

11. The computer readable storage medium of claim 7, wherein the program instructions are further executable to add the first set of indexing information to an index, wherein the index identifies archived data items.

12. The computer readable storage medium of claim 11, wherein the program instructions are further executable to:
    receive a request to access an archived copy of a data item identified in the index;

in response to receipt of the request, access the data item in the first backup image.

13. A system comprising:
one or more processors; and
a memory coupled to the one or more processors, wherein the memory stores program instructions executable to:
access a first backup image;
generate a first set of indexing information for the first backup image, wherein the first set of indexing information identifies one or more data items included within the first backup image;
compare the first set of indexing information to a second set of indexing information associated with a second backup image, wherein the second backup image is generated subsequent to a time at which the first backup image is generated;
identify a first data item of the one or more data items as having been modified or deleted after the time at which the first backup image is generated, in response to comparing the first and second sets of indexing information; and
copy the first data item from the first backup image to an archival data repository, prior to deletion of the first backup image.

14. The system of claim 13, wherein the first data item is copied in response to detecting that the first backup image will be deleted.

15. The system of claim 13, wherein generation of the first set of indexing information comprises accessing metadata associated with the first backup image, wherein the metadata was generated during a backup window in which the first backup image was generated.

16. The system of claim 13, wherein the first backup image is a block-level backup image.

17. The system of claim 13, wherein the program instructions are further executable to add the first set of indexing information to an index, wherein the index identifies archived data items.

18. The system of claim 17, wherein the program instructions are further executable to:
receive a request to access an archived copy of a data item identified in the index;
in response to receipt of the request, access the data item in the first backup image.

* * * * *